United States Patent

[11] 3,554,288

[72] Inventor Rupert D. Ross
  Findlay, Ohio
[21] Appl. No. 762,129
[22] Filed Sept. 24, 1968
[45] Patented Jan. 12, 1971
[73] Assignee Marathon Oil Company
  Findlay, Ohio
  a corporation of Ohio

[54] STIMULATING LOW PRESSURE NATURAL GAS PRODUCING WELLS
19 Claims, No Drawings

[52] U.S. Cl. .................................................. 166/305
[51] Int. Cl. ............................................... E21b 43/22
[50] Field of Search ........................................... 166/275,
  274, 273, 305, 306, 311, 312, 229; 252/8.55D, 8.55B

[56] References Cited
UNITED STATES PATENTS

| | | | |
|---|---|---|---|
| 2,331,594 | 10/1943 | Blair, Jr. ...................... | 166/305UX |
| 2,356,205 | 8/1944 | Blair, Jr. et al. ............... | 252/8.55 |
| 2,369,831 | 2/1945 | Jones et al. ................... | 252/8.55 |
| 3,254,714 | 6/1966 | Gogarty et al. ............... | 166/274 |

Primary Examiner—Stephen J. Novosad
Attorneys—Joseph C. Herring, Jack L. Hummel and Richard C. Willson, Jr.

ABSTRACT: Water blockage in subterranean formations, commonly known as water coning, is effectively removed by injecting into the well bore a sufficient amount of a micellar solution to contact the area of water blockage resulting in "solubilizing" the water to facilitate the flow of hydrocarbon toward the well bore.

STIMULATING LOW PRESSURE NATURAL GAS PRODUCING WELLS

BACKGROUND OF THE INVENTION

Water coning around a producing well can reduce the relative permeability to the flow of crude oil and thus adversely affect the removal of hydrocarbon from a subterranean formation. This adversity is experienced with gas wells wherein water saturation around the immediate area of the well bore is concentrated to effectively reduce the permeability to the flow of gaseous hydrocarbons. In order to effectively remove the water blockage, it is desired that the water be removed and the wettability of the reservoir rock be changed to enhance the movement of hydrocarbon (this term includes gaseous liquid and fluid hydrocarbons) to the well bore. Thus the relative permeability to the flow of hydrocarbon is improved.

In general, high water saturations around a well bore can be caused by natural ingress of free water saturation from the producing formation or induced by water from drilling fluids, etc. or from casing leaks or various other causes, the result being to increase the saturation of water in the producing formation and thus reduce the relative permeability to the flow of hydrocarbon. The object of this invention is to overcome this reduced relative permeability to the flow of hydrocarbon by removing the water blockage.

Applicant has discovered that by injecting a sufficient amount of a micellar solution to contact the high water saturation in the reservoir rock and permitting the micellar solution to "solubilize" the water, the adversities of water blockage can be improved. It is postulated that the micellar solution not only solubilizes the water but also wets the rock to make it more permeable to the flow of hydrocarbon than to the flow of water. The term "solubilize" as used herein defines substantial absorption or substantial emulsification of the water blockage by the micellar solution. The term does not necessarily mean that the water blockage is miscible with the micellar solution.

DESCRIPTION OF THE INVENTION

The term "micellar dispersion" as used herein is meant to include micellar solutions, microemulsions, "transparent" emulsions (Blair, Jr. et al., U.S. Pat. No. 2,356,205) and micellar solution technology taught in C. G. Sumner, Clayton's, The Theory of Emulsions and Their Technical Treatment, 5th Edition, pp. 315—320 (1954). Examples of useful micellar solutions include those defined in U.S. Pat. Nos. 3,254,714; 3,275,075 and 3,301,325 to Gogarty et al.; and 3,307,628 to Sena. Micellar dispersions differ in many ways from emulsions, e.g. the former are thermodynamically stable systems whereas the latter are not and the former are generally transparent whereas the latter are generally opaque.

Micellar dispersions are composed of hydrocarbon, aqueous medium, and surfactant. Cosurfactant(s) and electrolyte(s) can be incorporated within the micellar dispersion. Examples of volume amounts include from about 4 to about 60 percent or more of hydrocarbon, from about 20 to about 90 percent aqueous medium, at least about 4 percent surfactant, from about 0.01 to about 20 percent cosurfactant (also identified as cosolubilizer and semipolar organic compound) and from about 0.001 to about 5 percent or more (weight percent based on aqueous medium) of electrolyte. The micellar dispersion can be oil external or water external but preferably is oil external.

Examples of hydrocarbon include crude oil (both sweet and sour), partially refined fractions of crude oil, and refined fractions of crude oil. Specific examples of hydrocarbon include side cuts from crude columns, crude column overheads, gas oils, kerosene, heavy naphthas, naphthas, straight run gasoline, liquefied petroleum gases, propane, pentane, heptane, decane, dodecane, cyclohexane, aryl compounds, including benzene, naphthalene, anthracene, and alkylated aryl compounds such as alkyl phenols, etc. Preferably, the hydrocarbon is one locally available and can be crude oil characteristic of the reservoir. Also, the hydrocarbon can be unsulfonated hydrocarbon within petroleum sulfonates.

The aqueous medium can be soft, brackish, or brine water. Preferably the water is soft but it can contain small amounts of salts which are characteristic of the ions within the subterranean formation.

Useful surfactants within the micellar dispersion include nonionic, cationic, and anionic surfactants. Specific examples include surfactants taught in U.S. 3,254,714 to Gogarty et al. Other useful surfactants include Duponol WAQE (a 30 percent active sodium lauryl sulfate marketed by DuPont Chemical Corporation, Wilmington, Delaware), Energetic W-100 (a polyoxyethylene alkyl phenol marketed by Armour Chemical Company, Chicago, Illinois), Triton X-100 (an alkylphenoxy polyethoxy ethanol marketed by Rohm & Haas, Philadelphia, Pennsylvania) and Arquad 12—50 (a 50 percent active dodecyl trimethyl ammonium chloride marketed by Armour Chemical Company, Chicago, Illinois), and like materials.

Preferably, the surfactant is a petroleum sulfonate, also known as alkyl aryl napthenic sulfonate. The sulfonate can contain a monovalent, divalent or higher valency cation. Examples of preferred surfactants are the sodium and ammonium petroleum sulfonates having an average molecular weight within the range of from about 360 to about 520, and more preferably from about 400 to about 450. The surfactant can be a mixture of low and high molecular weight sulfonates or a mixture of two or more different surfactants.

Cosurfactants useful with the invention include alcohols, amino compounds, esters, aldehydes, ketones, and like materials containing from 1 to about 20 or more carbon atoms. More preferably, the cosurfactant contains from about 3 to about 16 carbon atoms. Specific examples include alcohols such as isopropanol, n- and iso-butanol, amyl alcohols such as n-amyl alcohol, 1- and 2-hexanol, 1- and 2-octanol, decyl alcohols, dodecyl alcohols, etc., alkaryl alcohols such as p-nonylphenol and alcoholic liquors such as fuel oil. Preferably, from about 0.1 to about 5 percent of cosurfactant is useful in the dispersion. Mixtures of two or more cosurfactants are also useful.

Electrolytes useful in the micellar dispersion include inorganic acids, inorganic bases, inorganic salts, organic acids, organic bases, and organic salts. Specific examples of electrolytes include sodium hydroxide, sodium chloride, sodium sulfate, hydrochloric acid, sulfuric acid, and those electrolytes found in U.S. Pat. No. 3,330,343 to Tosch et al. and U.S. Pat. No. 3,297,084 to Gogarty et al. Little or no electrolyte can be used when the micellar dispersion is designed to have a maximum uptake of brine or connate water, i.e. the dispersion has a capability of solubilizing a large amount of connate water. In addition, the electrolyte can be the salts within the aqueous medium.

Where the micellar dispersion is designed to have a maximum affinity for connate water, it may be desired to use a lower molecular weight surfactant and/or a lower molecular weight cosurfactant in an aqueous medium containing little or no electrolyte. Also, the hydrocarbon can be one which is more hydrophilic, these combinations giving a micellar dispersion having a large affinity for brine or an increased uptake for the connate water within the formation. More preferably, the micellar dispersion is designed to be hydrophilic so that a maximum amount of connate water can be taken up or "solubilized" by the micellar dispersion.

Desirably, the micellar dispersion has a mobility about equal to or less than that of the formation fluids within the immediate vicinity of the well bore. That is, the mobility of the micellar dispersion is about equal to or less than that of the mobility of the combination of connate water and hydrocarbon.

The size of the micellar dispersion should be sufficient to completely saturate the rock pores within the immediate vicinity of the well bore that constitutes the water blockage. Examples of volume amounts include from about 0.1 to about 10 barrels (42 gallons per barrel) of micellar dispersion per vertical foot of hydrocarbon-bearing formation, i.e. reservoir rock. Generally, from about 1 to about 3 barrels per vertical foot of oil-bearing formation will effectively remove most water blockage.

It is intended that this invention not be limited by the specific embodiments taught herein. Rather, all equivalents obvious to those skilled in this art are to be interpreted within the scope of the invention.

I claim:

1. A method of removing water blockage from a formation area in the immediate vicinity of a well bore, the method comprising injecting into the formation a sufficient amount of a micellar dispersion, comprised of a petroleum sulfonate having an average molecular weight within the range of about 360 to about 520, to solubilize sufficient water within the water blockage to increase the relative permeability to the flow of hydrocarbon, and then permitting the hydrocarbon to flow toward the well bore.

2. The method of claim 1 wherein from about 0.1 to about 10 barrels of the micellar dispersion per vertical foot of hydrocarbon-bearing formation is injected into the formation.

3. The method of claim 1 wherein the micellar dispersion is comprised of hydrocarbon, aqueous medium, and cosurfactant.

4. The method of claim 1 wherein the micellar dispersion is designed to have a large affinity for connate water within the formation.

5. The method of claim 1 wherein the hydrocarbon is substantially gaseous.

6. The process of claim 1 wherein the micellar dispersion is comprised of about 4—60 percent of hydrocarbon, about 20 to about 90 percent aqueous medium, and at least about 4 percent petroleum sulfonate.

7. A method of removing water blockage from a hydrocarbon-bearing formation area in the immediate vicinity of a well bore, the method comprising injecting into the formation from about 0.1 to about 10 barrels per vertical foot of a hydrocarbon-bearing formation of a micellar dispersion comprised of hydrocarbon, petroleum sulfonate having an average molecular weight within the range of about 360 to about 520, aqueous medium, and cosurfactant to solubilize the water within the water blockage and then permitting the hydrocarbon to flow toward the well bore.

8. The process of claim 7 wherein from about 1 to about 3 barrels per vertical foot of hydrocarbon-bearing formation of the micellar dispersion is injected into the formation.

9. The process of claim 7 wherein the petroleum sulfonate has an average molecular weight within the range of from about 400 to about 440.

10. The method of claim 7 wherein the cosurfactant is an alcohol containing from about 1 to about 20 carbon atoms.

11. The method of claim 7 wherein the micellar dispersion is designed to have a high affinity for solubilizing the connate water characteristic of the formation.

12. The method of claim 7 wherein the hydrocarbon within the formation is substantially gaseous.

13. A method of removing water blockage in the immediate vicinity of a well bore penetrating a gaseous hydrocarbon-bearing formation, comprising injecting into the formation from about 0.1 to about 10 barrels per vertical foot of hydrocarbon-bearing formation of a micellar dispersion comprised of hydrocarbon, petroleum sulfonate having an average molecular weight of about 360 to about 520, aqueous medium, and cosurfactant to solubilize the water within the water blockage and then permitting the hydrocarbon to flow toward the well bore.

14. The method of claim 13 wherein from about 1 to about 3 barrels of micellar dispersion is injected into the formation.

15. A method of removing water blockage from a hydrocarbon-bearing formation in the immediate vicinity of a well bore, the method comprising injecting into the formation from about 0.1 to about 10 barrels per vertical foot of a hydrocarbon-bearing formation of a micellar dispersion comprised of hydrocarbon, petroleum sulfonate having an average molecular weight of about 360 to about 520, aqueous medium, and cosurfactant characterized in that the surfactant and the cosurfactant are of a sufficiently lower molecular weight range to impart a more hydrophilic characteristic to the micellar dispersion, permitting the micellar dispersion to remain in contact with the oil-bearing formation for sufficient time to solubilize the water within the water blockage and then permitting the well to reproduce.

16. The process of claim 15 wherein the mobility of the micellar dispersion is about equal to or less than that of the formation fluids within the immediate vicinity of the well bore.

17. The process of claim 15 wherein the petroleum sulfonate contains a monovalent cation and has an average molecular weight within the range of about 400 to about 450.

18. The process of claim 15 wherein the micellar dispersion is comprised of about 4 to about 60 percent hydrocarbon, about 20—90 percent aqueous medium, at least about 4 percent petroleum sulfonate, and about 0.01 to about 20 percent cosurfactant.

19. The process of claim 18 wherein the micellar dispersion also contains about 0.001 to about 5 percent or more by weight of electrolyte.